(12) United States Patent
Khandhadia et al.

(10) Patent No.: US 8,622,419 B2
(45) Date of Patent: Jan. 7, 2014

(54) VEHICLE COMPONENT WITH INTEGRAL INFLATOR

(75) Inventors: Paresh S. Khandhadia, Troy, MI (US); Sean P. Burns, Almont, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 1819 days.

(21) Appl. No.: 11/191,291

(22) Filed: Jul. 27, 2005

(65) Prior Publication Data

US 2006/0022444 A1 Feb. 2, 2006

Related U.S. Application Data

(63) Continuation-in-part of application No. 11/067,040, filed on Feb. 25, 2005.

(60) Provisional application No. 60/591,441, filed on Jul. 27, 2004.

(51) Int. Cl.
*B60R 21/16* (2006.01)

(52) U.S. Cl.
USPC ...................................... 280/730.2

(58) Field of Classification Search
USPC .................................. 280/730.2, 730.1, 736
See application file for complete search history.

(56) References Cited

U.S. PATENT DOCUMENTS

| | | |
|---|---|---|
| 3,397,639 A | 8/1968 | Alderfer |
| 3,606,377 A | 9/1971 | Martin |
| 3,721,456 A | 3/1973 | McDonald |
| 3,733,088 A | 5/1973 | Stephenson |
| 3,785,674 A | 1/1974 | Poole et al. |
| 3,799,573 A | 3/1974 | McDonald |
| 3,897,961 A | 8/1975 | Leising et al. |
| 3,904,221 A | 9/1975 | Shiki et al. |
| 3,929,074 A | 12/1975 | San Miguel |
| 3,986,808 A | 10/1976 | Keith |
| 4,005,876 A | 2/1977 | Jorgensen et al. |
| 4,012,211 A | 3/1977 | Goetz |
| 4,200,615 A | 4/1980 | Hamilton et al. |
| 4,322,385 A | 3/1982 | Goetz et al. |
| 4,358,998 A | 11/1982 | Schneiter et al. |
| 4,781,645 A | 11/1988 | Kato |
| 4,846,368 A | 7/1989 | Goetz |
| 4,878,690 A | 11/1989 | Cunningham |

(Continued)

FOREIGN PATENT DOCUMENTS

JP 5-64015 8/1993

OTHER PUBLICATIONS

Office Action for U.S. Appl. No. 11/067,040, filed Feb. 25, 2005.

*Primary Examiner* — Faye M. Fleming
(74) *Attorney, Agent, or Firm* — L.C. Begin & Associates, PLLC (57) ABSTRACT

A method of manufacturing a vehicle component is presented, wherein the vehicle component has at least one dimensional length, the method containing the steps of: providing an elongated perforated inflator substantially coextensive with said at least one dimensional length; fixing said elongated perforated inflator within said vehicle component along said at least one dimensional length, such that said inflator functions as a structural member of said vehicle component; providing a propellant bed substantially coextensive with said elongated perforated inflator; and providing an airbag in fluid communication with said inflator and substantially coextensive therewith, said airbag stored within said vehicle component.

13 Claims, 8 Drawing Sheets

(56) References Cited

U.S. PATENT DOCUMENTS

| | | | |
|---|---|---|---|
| 4,890,860 A | 1/1990 | Schneiter | |
| 4,950,458 A | 8/1990 | Cunningham | |
| 5,094,475 A | 3/1992 | Olsson et al. | |
| 5,101,730 A | 4/1992 | Bender et al. | |
| 5,109,772 A | 5/1992 | Cunningham et al. | |
| 5,139,588 A | 8/1992 | Poole | |
| 5,211,224 A | 5/1993 | Bouldin | |
| 5,224,733 A * | 7/1993 | Simsic | 280/730.2 |
| 5,308,370 A | 5/1994 | Kraft et al. | |
| 5,322,322 A | 6/1994 | Bark et al. | |
| 5,324,071 A | 6/1994 | Gotomyo et al. | |
| 5,345,873 A | 9/1994 | Lauritzen et al. | |
| 5,368,329 A * | 11/1994 | Hock | 280/741 |
| 5,409,259 A | 4/1995 | Cunningham et al. | |
| 5,439,250 A | 8/1995 | Kokeguchi et al. | |
| 5,443,286 A | 8/1995 | Cunningham et al. | |
| 5,462,308 A | 10/1995 | Seki et al. | |
| 5,464,249 A | 11/1995 | Lauritzen et al. | |
| 5,482,315 A | 1/1996 | Chandler et al. | |
| 5,503,079 A | 4/1996 | Kishi et al. | |
| 5,503,428 A | 4/1996 | Awotwi et al. | |
| 5,503,806 A | 4/1996 | Fulmer et al. | |
| 5,540,154 A | 7/1996 | Wilcox et al. | |
| 5,540,459 A | 7/1996 | Daniel | |
| 5,542,704 A | 8/1996 | Hamilton et al. | |
| 5,547,638 A | 8/1996 | Rink et al. | |
| 5,551,343 A | 9/1996 | Hock et al. | |
| 5,562,303 A | 10/1996 | Schleicher et al. | |
| 5,573,271 A | 11/1996 | Headly | |
| 5,578,787 A | 11/1996 | Kobari et al. | |
| 5,588,670 A | 12/1996 | Storey et al. | |
| 5,588,672 A | 12/1996 | Karlow et al. | |
| 5,607,181 A | 3/1997 | Richardson et al. | |
| 5,615,914 A * | 4/1997 | Galbraith et al. | 280/743.1 |
| 5,623,115 A | 4/1997 | Lauritzen et al. | |
| 5,626,360 A | 5/1997 | Lauritzen et al. | |
| 5,635,665 A | 6/1997 | Kishi et al. | |
| 5,735,572 A | 4/1998 | Clark et al. | |
| 5,743,556 A | 4/1998 | Lindsey et al. | |
| 5,752,715 A | 5/1998 | Pripps et al. | |
| 5,779,263 A * | 7/1998 | Lane et al. | 280/730.2 |
| 5,826,904 A | 10/1998 | Ellis et al. | |
| 5,827,996 A | 10/1998 | Yoshida et al. | |
| 5,845,933 A | 12/1998 | Walker et al. | |
| 5,868,424 A | 2/1999 | Hamilton et al. | |
| 5,871,228 A | 2/1999 | Lindsey et al. | |
| 5,908,204 A | 6/1999 | Smith | |
| 5,941,563 A | 8/1999 | Schoenborn | |
| 5,941,752 A | 8/1999 | Liebermann | |
| 5,967,550 A | 10/1999 | Shirk et al. | |
| 6,019,861 A | 2/2000 | Canterberry et al. | |
| 6,029,994 A | 2/2000 | Perotto et al. | |
| 6,032,979 A | 3/2000 | Mossi et al. | |
| 6,039,820 A | 3/2000 | Hinshaw et al. | |
| 6,051,158 A | 4/2000 | Taylor et al. | |
| 6,053,110 A | 4/2000 | Marchant et al. | |
| 6,056,319 A | 5/2000 | Ruckdeschel et al. | |
| 6,062,143 A | 5/2000 | Grace et al. | |
| 6,077,371 A | 6/2000 | Lundstrom et al. | |
| 6,129,023 A | 10/2000 | Marsaud et al. | |
| 6,142,518 A | 11/2000 | Butt et al. | |
| 6,145,876 A | 11/2000 | Hamilton | |
| 6,170,867 B1 | 1/2001 | Rink et al. | |
| 6,176,517 B1 | 1/2001 | Hamilton et al. | |
| 6,177,028 B1 | 1/2001 | Kanda et al. | |
| 6,315,847 B1 | 11/2001 | Lee et al. | |
| 6,336,651 B1 | 1/2002 | Mramor et al. | |
| 6,347,566 B1 | 2/2002 | Rabotinsky et al. | |
| 6,371,514 B1 * | 4/2002 | Bombard | 280/730.2 |
| 6,382,661 B1 | 5/2002 | Sutherland | |
| 6,412,816 B1 | 7/2002 | Gast et al. | |
| 6,416,599 B1 | 7/2002 | Yoshikawa et al. | |
| 6,425,601 B1 | 7/2002 | Lewis | |
| 6,497,429 B2 | 12/2002 | Matsumoto | |
| 6,502,513 B1 | 1/2003 | Barnes et al. | |
| 6,595,546 B2 | 7/2003 | Smith | |
| 6,595,547 B2 | 7/2003 | Smith | |
| 6,601,871 B2 | 8/2003 | Fischer | |
| 6,688,231 B1 | 2/2004 | Herrmann | |
| 6,752,421 B2 | 6/2004 | Khandhadia et al. | |
| 6,755,438 B2 | 6/2004 | Rink et al. | |
| 6,805,377 B2 | 10/2004 | Krupp et al. | |
| 6,846,013 B2 | 1/2005 | Smith | |
| 6,846,014 B2 | 1/2005 | Rink et al. | |
| 6,935,653 B2 * | 8/2005 | Koh | 280/728.2 |
| 6,942,261 B2 | 9/2005 | Larsen et al. | |
| 7,025,164 B2 | 4/2006 | Takimoto | |
| 7,025,379 B2 * | 4/2006 | Breed et al. | 280/730.2 |
| 7,052,041 B2 | 5/2006 | McCormick | |
| 2002/0038948 A1 | 4/2002 | Yamamori et al. | |
| 2003/0173761 A1 | 9/2003 | Rink et al. | |
| 2003/0178828 A1 | 9/2003 | Rink et al. | |
| 2003/0197354 A1 | 10/2003 | Beland et al. | |
| 2004/0061316 A1 | 4/2004 | Elqadah et al. | |
| 2004/0084885 A1 | 5/2004 | Burns et al. | |
| 2005/0104349 A1 | 5/2005 | Stevens et al. | |
| 2005/0116454 A1 | 6/2005 | Stevens | |
| 2005/0151358 A1 | 7/2005 | Burns | |
| 2005/0200103 A1 | 9/2005 | Burns et al. | |
| 2005/0218637 A1 | 10/2005 | Burns | |
| 2005/0218638 A1 | 10/2005 | Burns et al. | |
| 2006/0138763 A1 | 6/2006 | Brady | |

* cited by examiner

VEHICLE COMPONENT WITH INTEGRAL INFLATOR

CROSS REFERENCE TO RELATED APPLICATIONS

This application claims the benefit of provisional application Ser. No. 60/591,441 filed on Jul. 27, 2004. This application is also a continuation-in-part of U.S. application Ser. No. 11/067,040 filed on Feb. 25, 2005.

BACKGROUND OF THE INVENTION

The present invention relates to inflators for vehicle airbags and, more particularly, to a linear inflator which discharges inflation gas along the length of the inflator for use in side impact or head curtain airbag systems.

In inflation systems for deploying an air bag in a motor vehicle, it is desirable to be able to modify an inflation profile produced by a given inflator design without substantial modifications to the design, in order to accommodate different desired airbag inflation profiles. One method of varying the inflation profile is to modify the composition, amount, and/or physical arrangement of gas generant in the inflator. However, this method of varying the inflation profile may entail relatively complex changes to the inflator design and components, and may also add to inflator manufacturing cost and complexity.

In addition, many inflator housing designs possess degrees of strength and rigidity that are under-utilized in vehicle designs due to the configurations of the inflator housings.

SUMMARY OF THE INVENTION

An inflator construction is provided for use in an inflatable vehicle occupant protection system. In one aspect of the invention, the inflator includes a longitudinal enclosure having a substantially uniform cross-sectional area along at least a portion of the enclosure, and a gas generant composition positioned along at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The apertures of the first plurality of gas exit apertures are spaced apart a distance proportional to a desired rate of propagation of a combustion reaction of gas generant positioned between the apertures.

In another aspect of the invention, the inflator includes a longitudinal enclosure having a substantially uniform cross-sectional area along at least a portion of the enclosure, and a gas generant composition positioned along the at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The number of apertures in the first plurality of gas exit apertures is inversely proportional to a desired rate of propagation of a combustion reaction of gas generant positioned between the apertures.

In yet another aspect of the invention, an airbag device is disclosed which includes an inflator having an inflator housing configured as a structural member of a vehicle. The inflator housing may be employed as a stand-alone structural member in the vehicle, or used to reinforce another structural member. The housing may include a cavity portion having a cylindrical cross-section. The cavity portion may serve as the structural member, or the housing may include extensions coupled to the cavity portion to provide a structural member having a desired configuration.

BRIEF DESCRIPTION OF THE DRAWINGS

In the drawings illustrating embodiments of the present invention:

FIG. 9 is a cross-sectional side view showing an alternative embodiment of the general structure of an inflator in accordance with the present invention;

DETAILED DESCRIPTION

Figure 1:
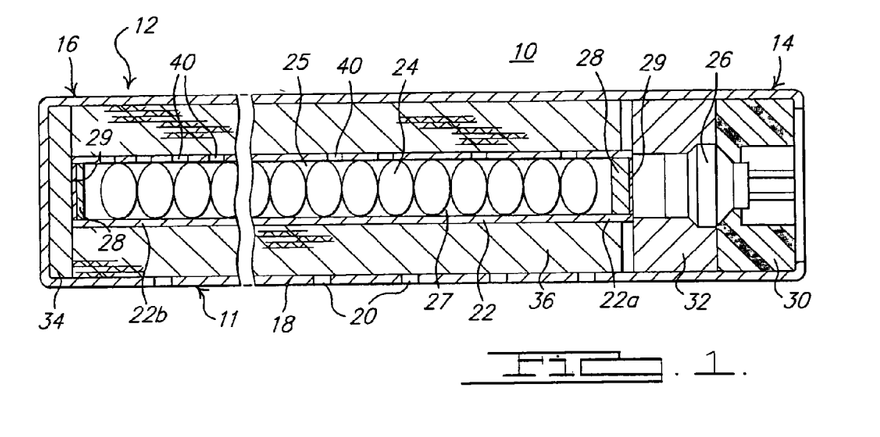
FIG. 1 is a cross-sectional side view showing the general structure of an inflator in accordance with the present invention.

FIG. 1 shows a cross-sectional view of an inflator 10 in accordance with the present invention. Inflator 10 is preferably constructed of components made from a durable metal such as carbon steel or iron, but may also include components made from tough and impact-resistant polymers, for example. One of ordinary skill in the art will appreciate various methods of construction for the various components of the inflator. U.S. Pat. Nos. 5,035,757, 6,062,143, 6,347,566, U.S. Patent Application Ser. No. 2001/0045735, WO 01/08936, and WO 01/08937 exemplify typical designs for the various inflator components, and are incorporated herein by reference in their entirety, but not by way of limitation.

Referring to FIG. 1, inflator 10 includes a tubular housing 12 comprising a cavity portion 11 for receiving inflator components, such as a gas generant composition, therein. Cavity portion 11 has a pair of opposed ends 14, 16 and a housing wall 18. Housing 12 may be cast, stamped, extruded, or otherwise metal-formed. A plurality of gas exit apertures 20 are formed along housing wall 18 to permit fluid communication between an interior of the housing and an airbag (not shown).

A longitudinal gas generant enclosure 22 is inwardly radially spaced from housing 12 and is coaxially oriented along a longitudinal axis of the housing. Enclosure 22 has an elongate, substantially cylindrical body defining a first end 22a, a second end 22b, and an interior cavity for containing a gas generant composition 24 therein. Enclosure first end 22a is positioned to enable fluid communication between an igniter 26 and the enclosure interior cavity. Enclosure 22 is configured to facilitate propagation of a combustion reaction of gas generant 24 along the enclosure, in a manner described in greater detail below.

A plurality of gas generant tablets 24 are stacked side by side along the length of enclosure 22. Each tablet 24 has substantially the same dimensions. In one embodiment, each gas generant tablet 24 has an outer diameter of ¼" and a pair of opposing, generally dome-shaped faces 27, providing a maximum tablet width of approximately 0.165" between faces. As seen in FIG. 1, tablets 24 are shaped or configured to advantageously create a cavity 25 between adjacent tablets 24. These cavities 25 provide a volume of air space relative within enclosure 22, thereby enhancing the burn characteristics of tablets 24 when they are ignited. An alternative arrangement of the gas generant along the length of the enclosure may be provided. Hoverer, any arrangement of gas generant along the enclosure preferably provides a substantially uniform average distribution of gas generant along the length of the enclosure. Examples of gas generant compositions suitable for use in the present invention are disclosed in U.S. Pat. Nos. 5,035,757, 6,210,505, and 5,872,329, incorporated herein by reference. However, the range of suitable gas generants is not limited to those described in the cited patents.

A quantity of a known auto-ignition composition 28 is positioned at either end of the stack of gas generant material 24. Enclosure 22 is environmentally sealed at both ends with an aluminum tape 29 or any other effective seal.

An igniter 26 is secured to inflator 10 such that the igniter is in communication with an interior of gas generant enclosure 22, for activating the inflator upon occurrence of a crash event. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. First endcap 32 also provides a closure for gas generant enclosure 22. A second endcap 34 is crimped or otherwise fixed to a second end 16 of housing 12. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the inflator design for filtering particulates from gases generated by combustion of gas generant 24. In general, filter 36 is positioned between gas generant 24 and apertures 20 formed along inflator housing wall 18. In the embodiment shown in FIG. 1, filter 36 is positioned exterior of gas generant enclosure 22 intermediate enclosure 22 and housing wall 18, and substantially occupies the annular space between gas generant enclosure 22 and housing wall 18. In an alternative embodiment (not shown), filter 36 is positioned in the interior cavity of enclosure 22 between gas generant 14 and enclosure gas exit apertures 40 formed along enclosure 22. The filter may be formed from one of a variety of materials (for example, a carbon fiber mesh or sheet) known in the art for filtering gas generant combustion products.

In accordance with the present invention, a plurality of gas exit apertures 40 is particularly formed along enclosure 22 to tailor the rate of propagation of a combustion reaction of the gas generant 24 along the enclosure, as required by design criteria. Apertures 40 are spaced apart along enclosure 22 as described in greater detail below. Enclosure 22 may be roll formed from sheet metal and then perforated to produce apertures 40. Enclosure apertures 40 are environmentally sealed with an aluminum tape 42 or any other effective seal.

The size of the holes or gas exit apertures preferably ranges from about one millimeter to about one-half the diameter of the propellant tube. Holes smaller than one millimeter are often difficult to manufacture with consistent size and with the desired efficiency. Holes or gas exit apertures larger than half the diameter of the propellant tube weaken the structure of the tube and are therefore relatively difficult to produce.

The gas exit apertures are preferably spaced about six millimeters to twenty-six millimeters on center (OC). A spacing less than about six mm may weaken the structure, and presents a further structural concern if the local or associated gas exit aperture size is relatively large or close to the diameter of the propellant tube. Spacing larger than twenty-six mm may be employed although the efficiency of the cooling screen may consequently be reduced.

As such, the present invention incorporates a tailored overall surface area dependent on both the size and spacing of the gas exit apertures. The overall surface area may be tailored based on various design criteria such as the composition of the gas generant and/or the desired inflation profile of an associated airbag, for example. The distribution of the overall surface area from a relatively lower aperture area within the first half of the propellant tube (that is the half closest or adjacent to the ignition source) to a relatively larger aperture area within the second half of the propellant tube (that is the half of the propellant tube farthest from the ignition source) provides the desired combustion propagation across the length of the tube.

The percentage of the total surface area as a function of the position of the holes from the ignition source is tabulated and exemplified below. The open area is defined as the sum of the area of each hole in the propellant tube. Starting with a known example of equally spaced holes of equal size, the orifice area is equally distributed throughout the length of the propellant tube. This results in the fastest propagation time and the shortest burnout time, or, the time required to completely combust the gas generant. The share of the aperture/orifice area at the ignition end of the tube is relatively smaller while the share of the orifice area at the opposite end of the ignition tube is relatively larger. This causes a proportional increase in the time it takes for the entire propellant stack to ignite and therefore affects the initial combustion rate and the duration of gas generation.

It is believed that after initiator 26 is activated, the propagation rate of the combustion reaction along the enclosure is dependent upon the number of apertures 40 and the spacing between the apertures along enclosure 22. More specifically, it is believed that, along the sections of the enclosure where the aperture spacing is 1" OC, the combustion reaction propagates via hot gases because the pressure inside this portion of the enclosure is relatively high due to the relative shortage of apertures to relieve the pressure; thus, there is a driving pressure force urging the hot gases further down the enclosure. In the sections where the aperture spacing is ½" OC, the combustion reaction still propagates via hot gases but at a slower rate because the internal pressure is relatively lower, due to the shorter distance between apertures. In the sections where the aperture spacing is ¼" OC, apertures 40 are relatively numerous, permitting the enclosure internal pressure to be more easily relieved; thus, there is minimal driving pressure force urging the hot gases further down the length of the enclosure. In this case, the combustion reaction continues to propagate at a relatively slower rate as each tablet 24 ignites the next adjacent tablet as it burns.

Thus, it is believed that a relatively greater spacing between enclosure apertures 40 produces a correspondingly greater pressure within enclosure 22, resulting in a more rapid propagation (via hot gases) of the combustion reaction along the portion of the gas generant residing between the spaced-apart apertures. The more rapid propagation of the combustion reaction results in a more rapid burning of the gas generant and, thus, a more rapid generation of inflation gas, and more rapid inflation of an associated airbag, for example. Therefore, to affect the propagation rate of a combustion reaction along a portion of the enclosure, the apertures along the portion of the enclosure may be spaced apart a distance proportional to a desired rate of propagation of a combustion reaction of gas generant positioned between the apertures. Therefore, the combustion propagation rate may be tailored using an appropriate arrangement of enclosure apertures, to accommodate greater or lesser desired airbag inflation rates, and also to accommodate desired shorter or longer inflation durations. It should be appreciated that the type of propellant or gas generant composition 24 employed, for example those described in U.S. Pat. Nos. 5,035,757, 5,872,329, and 6,210,505, each herein incorporated by reference, may also be determinative of the desired combustion propagation rate across the length of the propellant tube 22. Accordingly, the propellant employed will affect the aperture open area along the length of the propellant tube. As different propellants are employed, the "aperture open area/unit length of the propellant tube" may be iteratively determined by experimental methods to produce the desired propagation rate across the length of the enclosure or propellant tube. For example, propellant tubes containing the same propellant could be perforated with different open areas per unit length across the length of the propellant tube in accordance with the present invention, and then qualitatively and quantitatively evaluated for sustained combustion, combustion propagation, inflation profile of an associated airbag, gas generating duration, inflator pressure across the length thereof, and other design criteria.

TABLE

| | Exemplary Open Area Percentages for Respective Sectional Lengths of the Propellant Tube | | | |
| --- | --- | --- | --- | --- |
| | First 25% of Prop. Tube Length (closest to initiator end) | Second 25% of Prop. Tube Length (next to second end). | Third 25% of Prop. Tube Length (next to third end). | Fourth 25% of Prop. Tube Length (farthest from initiator end). |
| Equally Spaced and Sized Holes | 25% | 25% | 25% | 25% |
| Example 1 | 17% | 18% | 34% | 31% |
| Example 2 | 12% | 19% | 24% | 44% |
| Example 3 | 9% | 19% | 18% | 54% |
| Example 4 | 7% | 13% | 43% | 37% |

Preferred ranges for the percentage of the total aperture areas of each section of the propellant tube are as follows:
First 25% of Propellant Tube Length (Closest to the Initiator) - about 7–25%, and preferably
Second 25% of Propellant Tube Length - about 13–25%
Third 25% of Propellant Tube Length - about 18–43%
Fourth 25% of Propellant Tube Length - 25–54%

In view of the data given above, the present invention includes a propellant tube 22 having a plurality of gas exit apertures 40 wherein the area of each hole is calculated and a total open aperture area or sum is calculated by adding the gas exit aperture areas together. A first perforated section 23 or portion of the propellant tube 22 is fixed closest to the igniter 26, wherein the first portion 23 includes less than half of the total open aperture area. A second perforated section 25 or portion of the propellant tube 22 is integral to and in coaxial relation with the first portion 23, wherein the second portion 25 includes more than half of the total open aperture area. As exemplified in the table given above, the first portion 23 may include up to 75% of the total length of the propellant tube 22, for example. On the other hand, the second portion 25 may include as little as 25% of the total length of the propellant tube 22, for example. It should be appreciated that in a preferred embodiment, the first half 27 of the tube 22 will contain less than half of the total open aperture area, and the second half 29 of the propellant tube 22 will contain more than half of the total open aperture area. As discussed above, the respective first and second gas exit aperture areas of either the first or second sections may be tailored by the number and size of respective gas exit apertures included in either section.

Accordingly, consistent with the table given above, the present invention may also be characterized as an elongated inflator 10 comprising a plurality of collinear and integral sections that together constitute a single perforated tube 22. As such, in this embodiment, a first section nearest to an associated igniter, a second section juxtaposed to the first section, a third section juxtaposed to the second section, and a fourth section farthest from the igniter and juxtaposed to the third section constitute the propellant tube internal to the inflator. More generally, the present invention includes an elongated inflator 10 that contains an elongated propellant tube 22 substantially coextensive therewith. A first end 31 of the propellant tube 22 is fixed to an associated igniter 26. A second end 33 of the propellant tube 22 is preferably capped to seal off the flow of combustion gases upon inflator 10 activation. A plurality of gas exit orifices 40 is formed within the propellant tube 22 from the first end to the second end. As supported in the table shown above relative to overall open aperture area, the number and/or size of the apertures increases per unit length from the first end to the second end.

It is noted that the stacking of substantially uniform gas generant tablets 24 adjacent each other along enclosure 22 provides for a relatively constant average density of gas generant along the enclosure. Also, the use of an enclosure having a substantially constant cross-sectional area along the length of the enclosure provides for a substantially constant volume per unit length of the enclosure. These features aid in minimizing pressure variations within the enclosure due to such factors as variations in enclosure volume, and localized hot spots and higher pressure regions resulting from disparities in gas generant distribution along the enclosure. The dome-shaped faces of each propellant tablet further facilitates an ease of assembly in that each dome-shaped face provides a pivot point at its apex that physically communicates with the apex of an adjacent tablet's propellant face. Accordingly, by virtue of the pivot point created on each dome-shaped face, the same juxtaposed orientation of each propellant tablet is assured without undue complication.

Upon activation of the inflator, it is believed that the magnitude of the pressure drop along the inflator is related to the total number of apertures along the respective gas generant enclosure. It is also believed that a greater number of apertures along the enclosure, spaced along a greater length of the enclosure, provides a greater total aperture area for relief of enclosure internal pressure. Thus, a greater number of apertures along the gas generant enclosure may serve to reduce the combustion propagation rate relative to an enclosure having relatively fewer apertures, because of the relatively larger pressure drop in the enclosure having the greater number of apertures. Therefore, to affect the propagation rate of a combustion reaction along a portion of the enclosure, the number of apertures provided along the portion of the enclosure is made inversely proportional to a desired rate of propagation of a combustion reaction along the gas generant positioned between the apertures.

Figure 2:
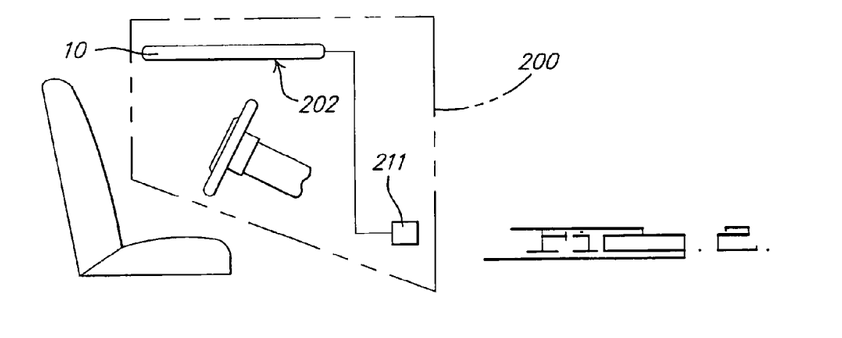
FIG. 2 is a schematic representation of an exemplary vehicle occupant restraint system incorporating an inflator in accordance with the present invention.

Referring now to FIG. 2, an inflator constructed in accordance with the principles outlined above may be incorporated into a vehicle occupant restraint system 200. Vehicle occupant restraint system 200 includes at least one airbag 202 (a side-curtain airbag in the embodiment shown) and an inflator 10 in accordance with the present invention and coupled to airbag 202 so as to enable fluid communication with an interior of the airbag. Vehicle occupant restraint system 200 may be in operative communication with a crash event sensor 211 which communicates with a known crash sensor algorithm that signals actuation of vehicle occupant restraint system 200 via, for example, activation of airbag inflator 10 in the event of a collision.

In yet another aspect of the present invention, the pyrotechnic inflator described above or other similarly constructed inflators such as those exemplified and described in U.S. application Ser. Nos. 09/846,004 and 10/662,771 (each incorporated herein by reference), may be configured as a structural member of a vehicle. As used herein, the use of the inflator housing as a "structural member" refers to the use of the housing in a structural role (such as load bearing or impact resistance) separate from the function of a conventional inflator (i.e., supplying an inflation fluid to an airbag or other inflatable element of a vehicle occupant protection system). Generally, such a structural role would normally be performed by an element different from a conventional inflator.

FIGS. 3-21 show examples of ways in which an inflator housing 12 in accordance with the present invention may be employed as a primary, stand-alone structural member in a vehicle, or as a member used to reinforce another structural member in the vehicle. Where the inflator housing is used as a stand-alone structural member, the housing may be fabricated in the desired shape of the structural member (for example, a frame used in a vehicle door). Alternatively, the housing may comprise a cavity portion having a cylindrical cross-section as previously described. The cylindrical cavity portion may serve as the structural member, or the housing may include one or more extensions coupled to the cavity portion as described herein to provide a structural member having the desired configuration. Where the inflator housing is used to reinforce another structural member, the housing may comprise a cavity portion having a cylindrical cross-section as previously described. The cylindrical cavity portion may be detachably coupled to the other structural member to provide the reinforcement, or the housing may include one or more extensions detachably coupled to the cavity portion as described herein to provide the reinforcement.

Figure 3:
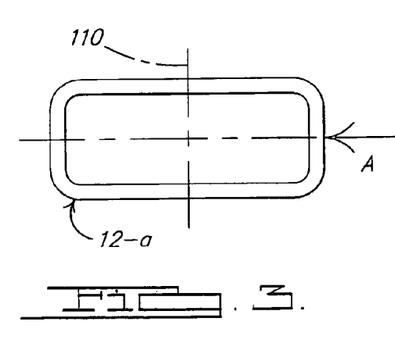
FIG. 3 is a cross-sectional end view of a first alternative inflator housing construction.
Figure 4:
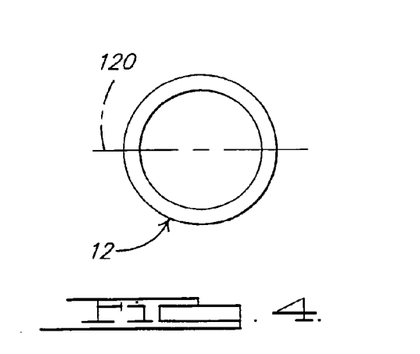
FIG. 4 is a cross-sectional end view of the inflator housing construction shown in FIG. 1.

Both in cases where the inflator housing is used as a stand-alone structural member and in cases where the inflator housing is intended to serve as reinforcement for another structural member of the vehicle, the configuration of the housing may be optimized for resistance to impact forces. In one example, shown in FIG. 3, housing 12 is formed with a generally rectangular shape. In the cross-section shown in FIG. 3, the average distance of the housing material from a neutral axis 110 of the cross-section is greater than the average distance of the housing material in a circular cross-section (FIG. 4) from its corresponding neutral axis 120. As is known in the art, increasing the average distance of the housing material from a neutral axis extending perpendicular to an applied bending force will increase the resistance of the cross-section to the bending force. Housing 12 of FIG. 3 is preferably oriented within the vehicle such that a projected resultant collision force vector acts along a line indicated by arrow "A".

Figure 5:
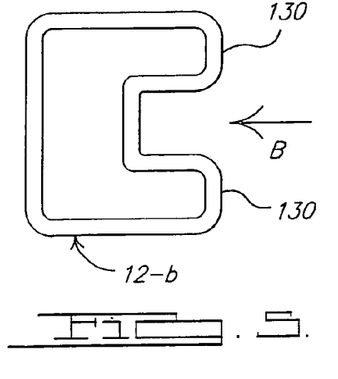
FIG. 5 is a cross-sectional end view of a second alternative inflator housing construction.
Figure 6:
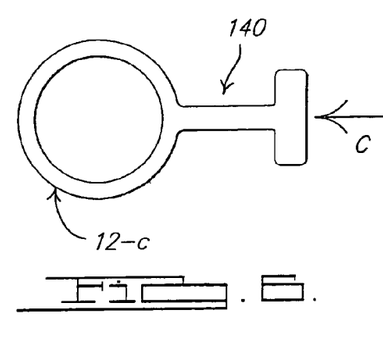
FIG. 6 is a cross-sectional end view of a third alternative inflator housing construction.

A stiffening of the inflator housing is also produced by employing cross-sections shaped as shown in FIGS. 5 and 6. In FIG. 5, a plurality of corrugations 130 are formed along at least one surface of inflator housing 12-b. Corrugations 130 act as stiffening members for resisting an impact force along an axis indicated by arrow "B". In FIG. 6, a "T"-section is formed along a side of a cylindrical housing cavity portion 12-c. The combination of the "T"-section and the cylindrical cavity portion acts as a modified "I"-beam, stiffening the inflator housing cross-section against a resultant force acting along an axis indicated by arrow "C". The cross-sections shown in FIGS. 5 and 6 may be produced by extrusion or any other suitable method. In addition, inflator cavity portions and extensions formed into any one of many other possible cross-sections may be used. However, the configuration of cavity portion 11 should enable use of the cavity portion as a structural member or as a support for another vehicle structural member. Either the cavity portion alone should be usable as a structural member or support, or the cavity portion should be usable as a structural member or support when coupled to extensions, other inflator housings, or other structural members, as described herein.

As explained above, inflator housing 12 alone may be used as a structural member for reinforcing another structural member of the vehicle. Referring to FIGS. 7-10, in other embodiments, housing 12 includes one or more extensions 150 extending from cavity portion 11 containing gas generant 24 and igniter 26. Extensions 150 further augment the structural and safety advantages of using inflator housing 12 as a reinforcement member by enabling the housing to be fabricated into any of a wide variety of shapes conforming to the contours of various other structural members (for example, vehicle roof pillars), according to design requirements. Extensions 150 may be solid or substantially hollow. Extensions 150 may also be formed integral with cavity portion 11. Alternatively, extensions 150 may comprise separate pieces that may be coupled to cavity portion 11 in a manner described in greater detail below.

Figure 7:
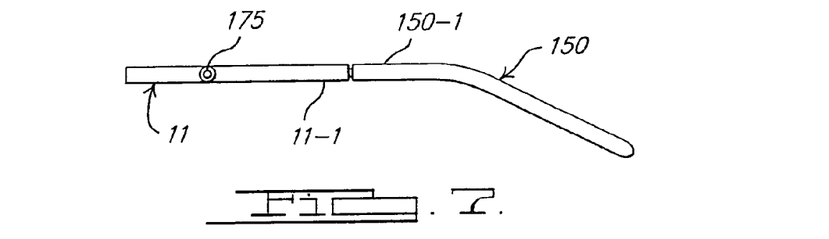
FIG. 7 is a side view of a fourth alternative inflator housing construction.
Figure 8:
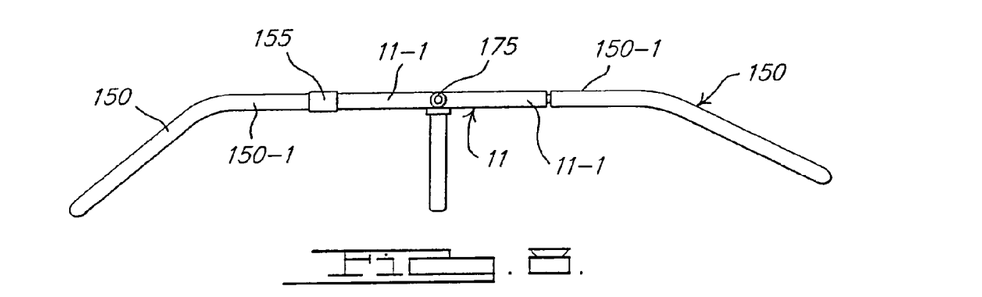
FIG. 8 is a side view of a fifth alternative inflator housing construction.

Referring to FIGS. 7-10, where extension 150 is formed from a discrete member and attached to housing cavity portion 11, a coupling means, generally designated 60, is provided to enable detachable coupling of the extension to the cavity portion. Referring to FIGS. 7-9, in one embodiment, the coupling means comprises an engaging portion 11-1 on the housing cavity portion 11 configured for engaging a complementary engaging portion 150-1 of extension 150. Any of several methods may be used to provide engagement between engaging portions 11-1 and 150-1. In one embodiment, engaging portions 11-1 and 150-1 are configured for engaging each other in an interference fit. In another embodiment, engaging portions 11-1 and 150-1 are configured for threadedly engaging each other.

Referring to FIG. 8, a collar 155 may be provided for facilitating either threaded or press-fit engagement of both cavity portion 11 and extension 150. Collar 155 is either internally threaded or designed to engage one or both of cavity portion 11 and extension 150 in an interference fit, as desired. In further embodiments, coupling between cavity portion 11 and extensions 150, other inflators, or other vehicle structural members may be effected by welding, brazing, adhesive application, fasteners, etc. In addition, polarization features may be incorporated into the coupling means to aid in orienting and securing cavity portion 11 and extension 150 with respect to each other.

Engaging portions 11-1 may comprise one or more threaded projections or openings provided along cavity portion 11 for engaging complementarily threaded projections or openings on end portions of extension 150. As seen in FIGS. 7, 8, 9, 11, and 12, multiple attachment points may be provided along inflator housing 12 for receiving portions of extensions 150 therein, for connecting to additional inflators, or for connecting to other vehicle structural members, according to design requirements. FIG. 9 shows one embodiment of a housing cavity portion 11 configured for attachment to one of more extensions 150, to one or more additional inflators, or to multiple additional vehicle structural members, as described herein. As seen in FIG. 9, endcaps 30, 34 are provided at each end of housing cavity portion 11. Endcaps 30, 34 are secured in position using a suitable securement method (for example, crimping of the housing as shown in FIG. 9).

Endcaps 30, 34 hermetically seal the portion of inflator housing 12 containing gas-generating components. An access orifice 165 may be provided in a wall of the inflator housing 12 to enable electrical connection of igniter 26 to an igniter activation circuit via wires or a cable (not shown). The coupling means 60, for coupling either extension 150 or another structural member of the vehicle to the inflator housing, is provided at each end portion of the housing cavity portion 11, on a side of housing crimp 170 opposite a respective one of endcaps 30, 34. Coupling means 60 are also provided along cavity portion 11 intermediate ends 14 and 16. In the embodiment shown in FIG. 9, the coupling means comprises a plurality of internal threads 175 formed in cavity portion 11. Threads 175 are adapted for engaging complementary threads formed along an extension 150, another inflator, or another structural member of the vehicle.

Figure 11:
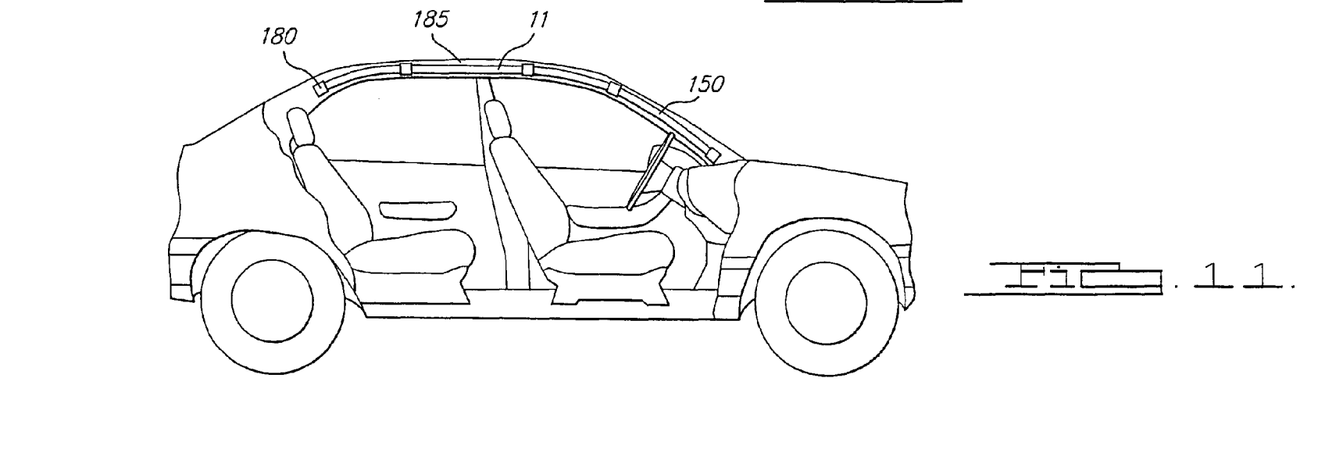
FIG. 11 is a cross-sectional side view of a vehicle showing one embodiment of a method for coupling an embodiment of the inflator housing to a vehicle.

Referring to FIG. 11, where the inflator housing is to be used to reinforce another structural member in the vehicle, another coupling means is provided along inflator housing 12 to enable coupling of the housing to the other structural member. Inflator housing 12 is preferably coupled to a portion of the vehicle using a method that secures the inflator housing in intimate contact with the vehicle before and during a collision event. This enables immediate and efficient transmission of collision forces to the inflator housing via the structural member to which the inflator housing is secured. Attachment methods such as welding or adhesive bonding may be suitable for this purpose. In a particular embodiment, the method of securing housing 12 to the vehicle permits relatively easy removal of the inflator housing for replacement after the inflator has been activated. FIG. 11 shows an embodiment of one exemplary method for coupling inflator housing 12 to a vehicle. An inflator housing cavity portion 11 and an extension 150, as previously described, are coupled to a structural member (in FIG. 11, a roof section) of a vehicle, extending between the vehicle C-pillar and the A-pillar, with extension 150 also extending along the A-pillar. A plurality of actuatable brackets 180 are welded or otherwise suitably secured along a structural member 185 of the vehicle to which inflator housing 12 is to be coupled. Brackets 180 may be opened to permit insertion and removal of inflator housing 12, and closed to secure housing 12 therein. When brackets 180 are closed, the brackets engage inflator housing 12 in an interference fit to secure the inflator housing in intimate contact with structural member 185. Brackets 180 are preferably secured to structural member 185 in a manner that prevents the brackets from separating from the structural member during collision, thereby enabling transmission of collision forces to inflator housing 12. In an alternative embodiment, inflator cavity portion 11 and extension 150 are welded or otherwise non-detachably coupled to brackets 180.

Other, alternative methods for coupling inflator housing 12 to another structural member of the vehicle are also contemplated. The actual method used to couple the inflator housing to the other structural member may be based on design requirements.

FIGS. 7-11, and 12 show several exemplary embodiments of inflator housings used for reinforcing other structural members of a vehicle. In essence, the inflator housing is configured for coupling to another structural member of a vehicle so as to reinforce the other structural member in the area in which the inflator housing is coupled. The other structural member is reinforced by the structure and inherent strength of inflator housing 12. Accordingly, airbag modules incorporating an airbag and a pyrotechnic inflator as described herein provide structural advantages and enhanced safety features heretofore not featured by side curtain airbag modules.

Figure 10:
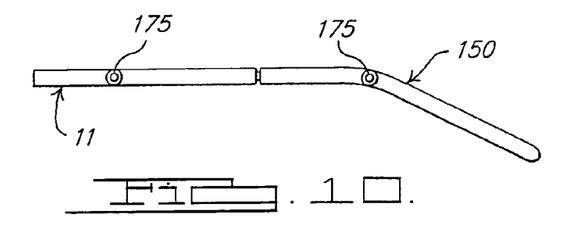
FIG. 10 is a side view of a sixth alternative inflator housing construction.

FIG. 10 shows an embodiment in which extension 150 is formed integral with cavity portion 11. As explained previously, extension 150 may be either solid or substantially hollow. In cases where extension 150 is hollow, an end closure (such as 30 or 34 in FIG. 9) is provided to hermetically seal cavity portion 11, thereby fluidly isolating cavity portion 11 from an interior portion of extension 150 to prevent leakage of inflation gas therein.

Figure 12:
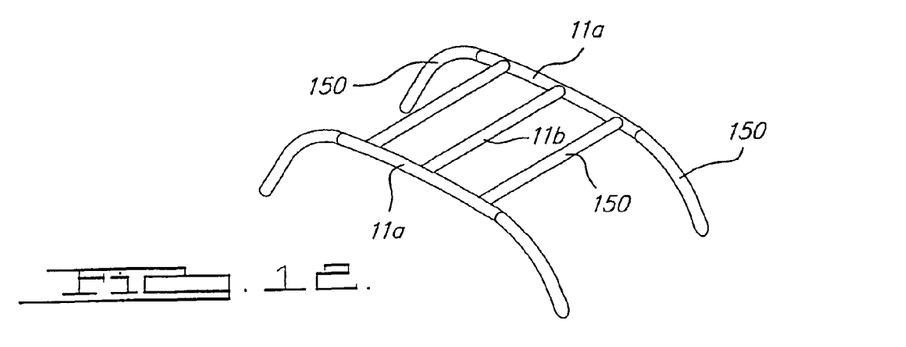
FIG. 12 is a perspective view of a seventh alternative inflator housing construction.

FIG. 12 shows a particular embodiment in which a network of cavity portions 11a, 11b and extensions 150 are incorporated into the vehicle roof and roof support pillars. Cavity portions 11a extend along sides of the vehicle roof between the A-pillars and the C-pillars. Cavity portions 11a are configured to inflate side-curtain airbags (not shown) along the driver side and passenger side of the vehicle. Cavity portion 11b is coupled to both of cavity portions 11a in a manner previously described. Cavity portion 11b is configured to inflate a ceiling-mounted airbag actuatable, for example, in the event of a vehicle rollover accident. In addition, multiple extensions 150 are coupled to cavity portions 11a in a manner previously described. Cavity portions 150 are also coupled to (and extend along) the vehicle A-pillars and C-pillars to provide reinforcement for these vehicle structural members. Extensions 150 also span the vehicle roof to connect opposite cavity portions 11a, thereby providing added strength to the support structure. The interconnected support structure formed by coupling cavity members and extensions as shown in FIG. 12 provides a "cage" partially enclosing the driver and passengers of the vehicle. In this manner, the inflator housings (comprising cavity portions 11a and 11b and extensions 150) increase the strength of the roof structure of the vehicle while also providing inflation gas to multiple inflators, thereby greatly enhancing vehicle occupant protection.

Figure 13:
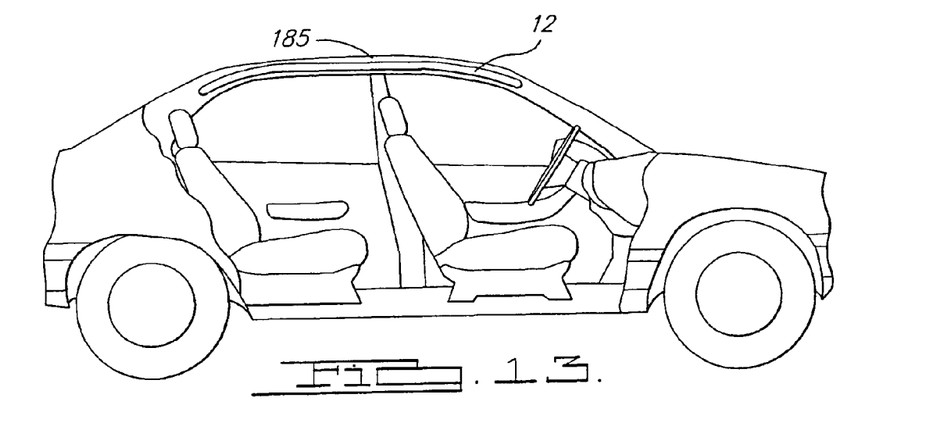
FIG. 13 is a cross-sectional side view of a vehicle showing one embodiment of a method for coupling another alternative embodiment of an inflator housing to a vehicle.

In yet another embodiment shown in FIG. 13, inflator housing 12 is positioned and secured to a vehicle roof 185 within the trim extending between vehicle roof pillars "A" and "C", to inflate a side-curtain airbag for protecting vehicle occupants during side collisions. When positioned as shown and secured to a portion of vehicle roof 185 (and, optionally, to one or more of vehicle roof pillars "A", "B", and "C"), inflator housing 12 acts to strengthen and stiffen the portion of the roof to which it is attached. In FIG. 13, the inflator housing is shown welded to a section of the vehicle roof extending between the A-pillar and the C-pillar.

Figure 14:
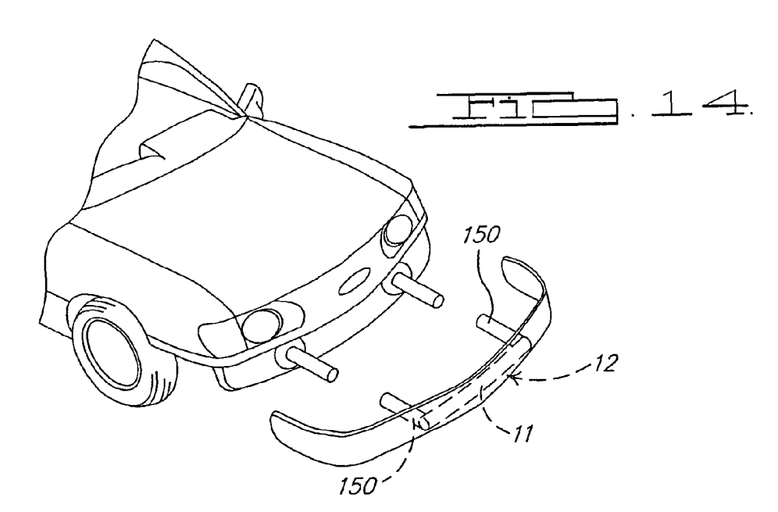
FIG. 14 is a perspective view showing one embodiment of an inflator housing formed into a structural member of a vehicle.

Referring to FIG. 14, in another embodiment, inflator housing 12 is formed into a vehicle bumper (or a portion of the bumper). The inflator housing includes a cavity portion extending substantially across the width of the vehicle and an extension 150 coupled to each end of the cavity portion. Extensions serve to couple cavity portion 11 to the frame of the vehicle. In this configuration, inflator housing absorbs collision forces incident on the bumper while simultaneously generating and supplying inflation gas to an inflatable element (for example, a bladder) of the vehicle bumper system. Bumper systems incorporating inflatable elements are known in the art. Several examples of such systems include U.S. Pat. Nos. 5,651,569 and 6,389,777, incorporated herein by reference.

In yet another aspect of the invention, a vehicle component is provided wherein the present inflator not only functions to provide a relatively quicker and more uniform inflation of the associated airbag, but also functions to provide structural enhancement to the respective component. By providing the inflator as an integral part of the associated component, a modular assembly at the ultimate assembly point is also facilitated, thereby simplifying the manufacturing process of the respective component. The vehicular components may for example include vehicle doors, seats, instrument panels and so forth. In accordance with one aspect of the present invention, it will be appreciated that as shown in FIGS. 15-21, the present inflator typically encompasses all, or substantially all, of the expanse or dimension of a particular member of the respective vehicle component. Stated another way, the inflator may be oriented along a dimensional measurement defined as the length, width, depth, or other dimension of the respective vehicle component. Further, as described herein, the inflator 22 has a propellant bed 24 that spans the length of the inflator 22, thereby providing uniform inflation of an airbag 25 when the inflator 22 is activated upon a crash event.

Figure 15:
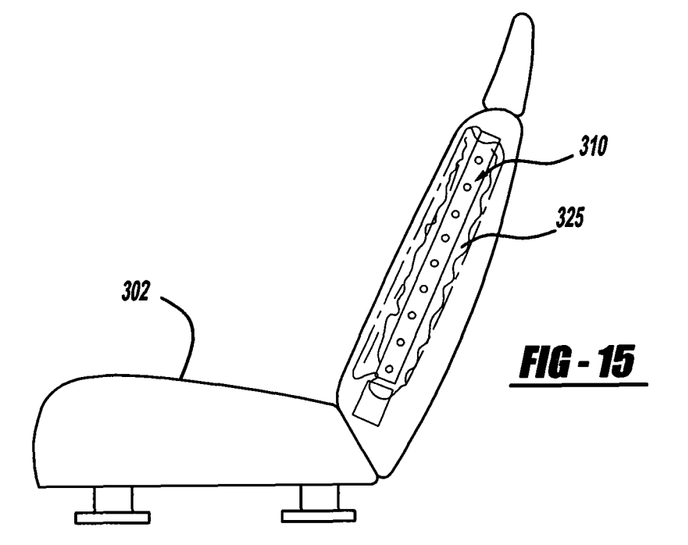
FIG. 15 is a side view of a seat with a view of the inflator extending along the length, or along the dimensional measurement, of the seat.
Figure 16:
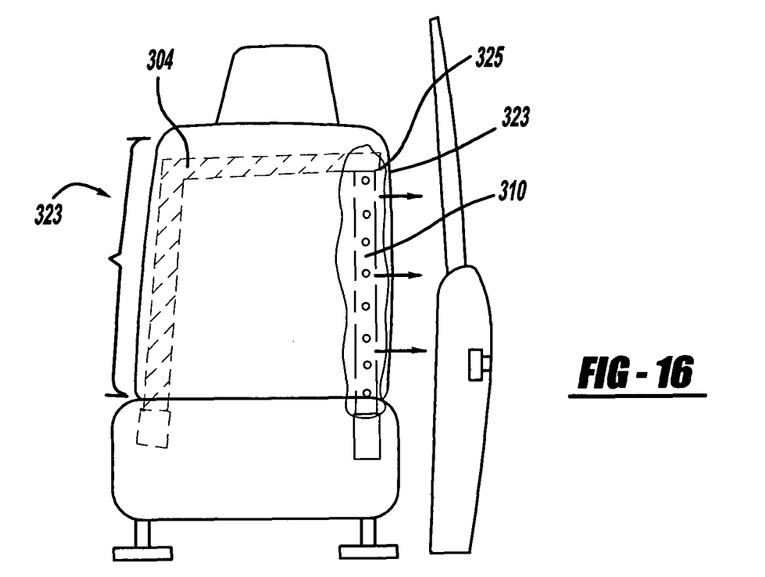
FIG. 16 is a front view showing a seat frame and an elongated inflator as a substantial element of the frame. Directional arrows show the path of deployment of an associated airbag along the dimensional measurement, or length, of the inflator.

In one embodiment shown in FIGS. 15 and 16, a vehicle seat 302 employing an inflator 310 of the present invention is shown. It will be appreciated that an inflator 310 as described herein is integrated into a seat frame or assembly 304 by welding or otherwise fixing the inflator 310 thereto. As shown, the inflator 310 extends for at least substantially all of the height or dimensional measurement 323 of the seat 302, or for at least substantially all of the respective dimension correlating to the structural member replaced by the inflator 310, thereby providing uniform inflation of an airbag 325 associated therewith. The airbag or inflatable cushion 325 may be formed as known in the art. As with any of the embodiments, the inflator 310 may be positioned within the length of the airbag 325, whereby the airbag 325 is simply laterally folded, and then stored along side the inflator 310 in substantial coextensive relation with the height of the seat. As exemplified in U.S. Pat. No. 5,588,671, herein incorporated by reference, the seat 302 may be provided with a tear seam 306 or other release mechanism as known in the art, thereby providing release of the airbag 325 upon gas generator 310 activation. As exemplified in U.S. Pat. Nos. 5,630,616 and 6,709,053, herein incorporated by reference, other features of the seat 302 may be manufactured or provided as known in the art. In operation, by employing an inflator 310 of the present invention, the airbag 325 is essentially uniformly inflated across the height (or depth) of the seat 302 thereby increasing the relative speed of inflation as compared to other airbag/inflator designs and also maximizing the occupant protection provided by the airbag 325. Furthermore, the inflator 310 functions as a structural member of the seat 302 thereby enhancing the occupant protection and comfort afforded thereby.

Figures 17, 18:
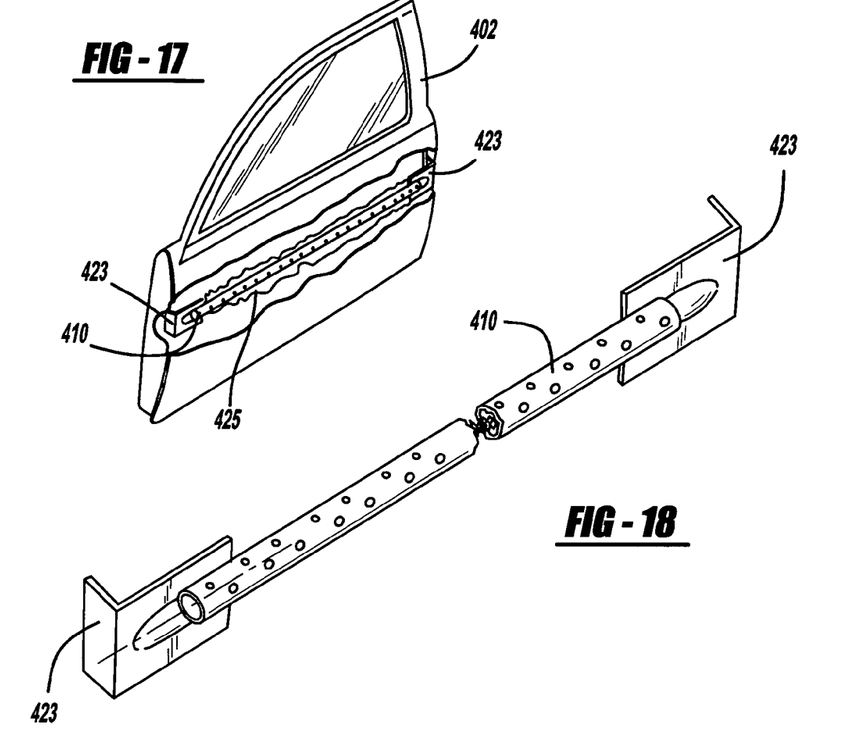
FIG. 17 is a view of a vehicular door illustrating an elongated inflator fixed within the door, wherein the inflator functions to inflate the airbag and also functions as a structural element. Again, the inflator is substantially coextensive with the length of dimensional measurement of the vehicle door.
FIG. 18 is a view of the inflator shown in FIG. 17 illustrating how the inflator is welded or otherwise fixed to the vehicular door.

In another embodiment shown in FIGS. 17 and 18, a vehicle door 402 employing an inflator 410 of the present invention is shown. It will be appreciated that an inflator 410 as described herein is integrated into the door assembly 402 thereby functioning as a side intrusion beam assembly for occupant protection during a side crash event. Again, as shown in FIG. 17, the inflator 410 extends for at least substantially all or most of the length of the door 402. As with any of the embodiments, it will be appreciated that the inflator 410 could, on the other hand, be placed in an orthogonal or oblique cross orientation relative to the length of the vehicle component or door 402 in this case, thereby tailoring the deployment of the airbag 425 to design criteria while yet still providing structural enhancement within the door. U.S. Pat. No. 5,813,719 exemplifies one method of fixing the inflator 410 to the door 402. It will be appreciated that other methods may be employed as understood by one of ordinary skill. In essence, an elongated inflator 410 of the present invention is welded to brackets 423 that are integral with or integrated to the door assembly 402. As exemplified in U.S. Pat. Nos.

Figure 19:
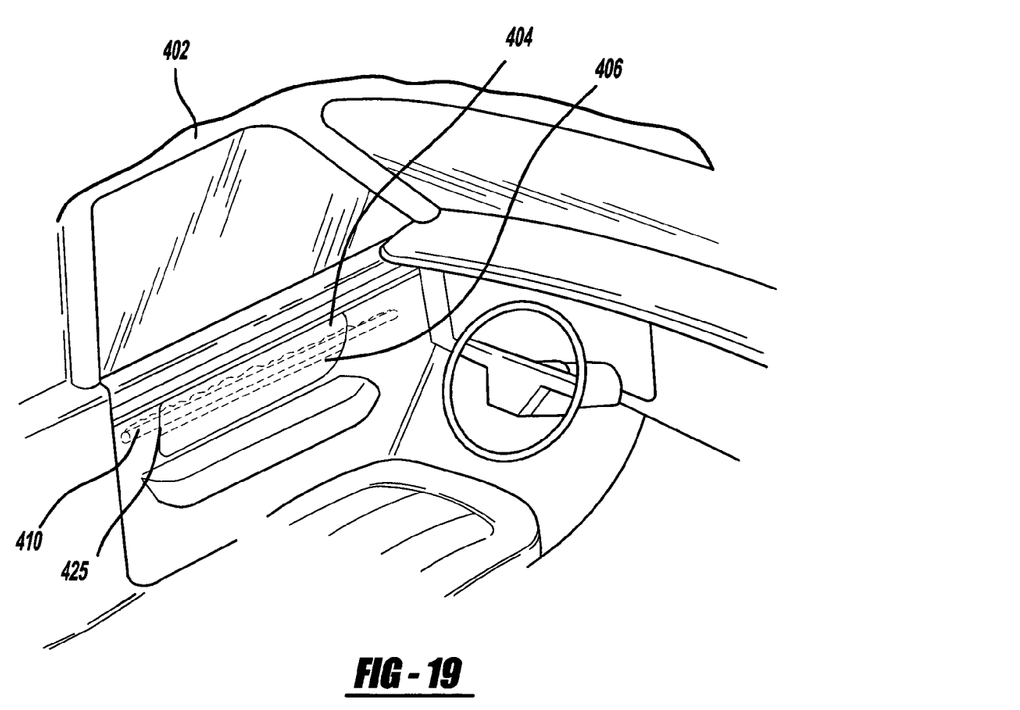
FIG. 19 is a view of the interior of a vehicle illustrating the airbag release mechanism along an inner panel of the door. In this case, a tear seam is illustrated as formed within a flexible cover on the door. The inflator and associated airbag are also illustrated within the door.

5,439,248 and 5,431,435, herein incorporated by reference, and as shown in FIG. 19, the door 402 may be provided with a detachable inner trim panel (not shown) facing the occupant, or, with a flexible door panel 404 having a tear seam 406, or, with any other airbag release mechanism known in the art, thereby providing release of the airbag upon gas generator activation. As exemplified in U.S. Pat. Nos. 6,378,896, 4,966, 388, and 5,865,496, other features of the door assembly 402 may be manufactured or provided as known in the art.

Figure 20:
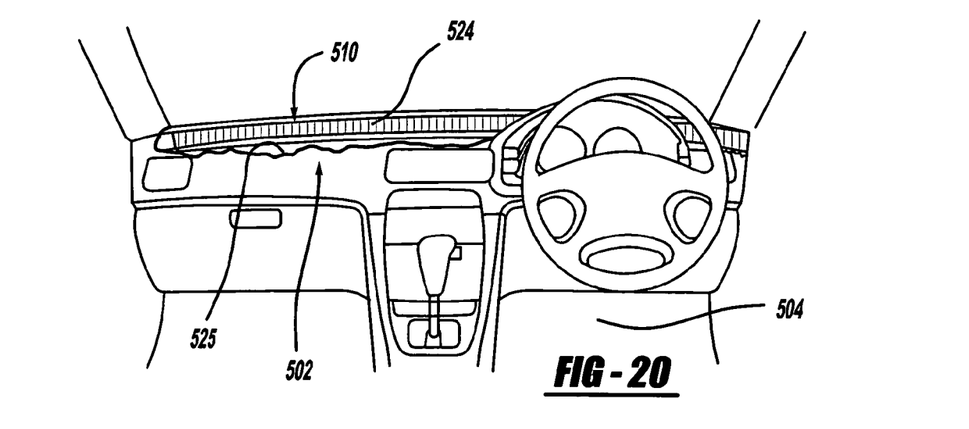
FIG. 20 is a view of an instrument panel incorporating an inflator across the front of the interior of the vehicle.
Figure 21:
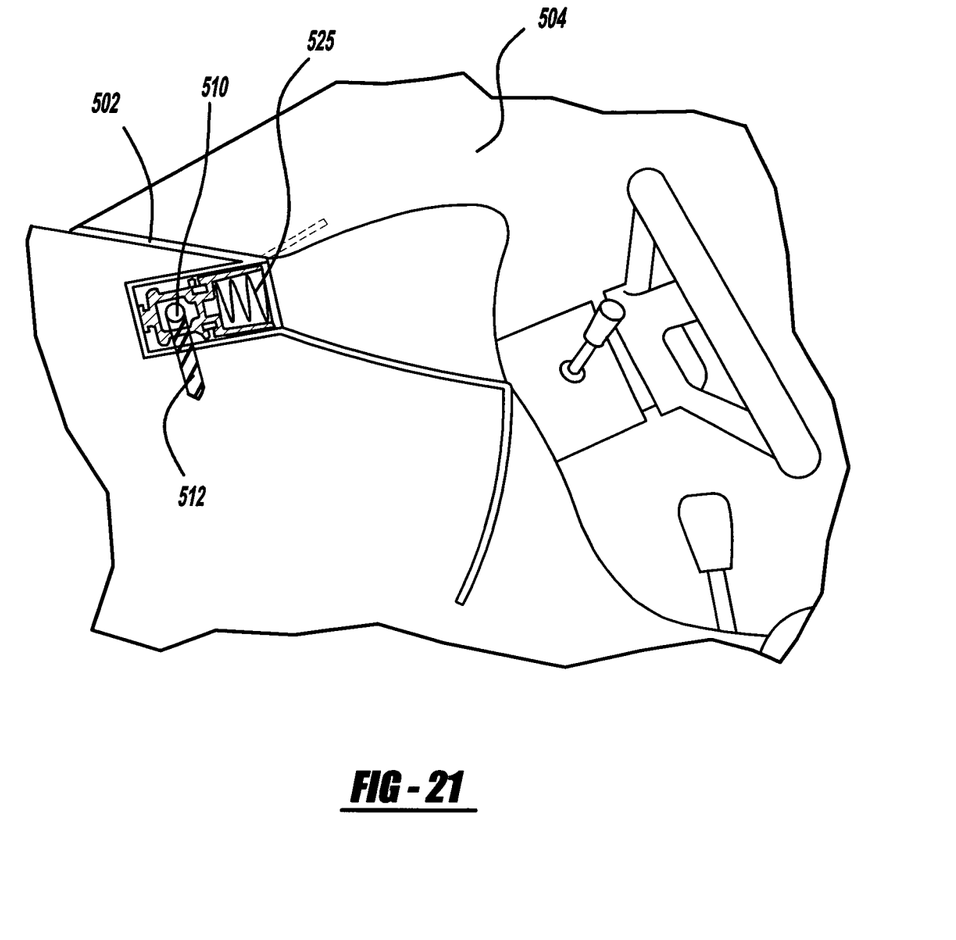
FIG. 21 is a side view of the instrument panel of FIG. 20 wherein the inflator is schematically shown attached to the vehicle frame underlying the instrument panel.

In yet another embodiment shown in FIGS. 20 and 21, a vehicle dashboard or instrument panel 502 employing an inflator 510 of the present invention is shown. It will be appreciated that an inflator 510 as described herein is integrated into the instrument panel 502 thereby functioning as a structural support across the front of the passenger cavity 504. Again, as shown in FIG. 20, the inflator 510 extends for at least substantially all or most of the length of the instrument panel 502. A gas generant bed 524 is substantially coextensive with the length of the inflator 510. The inflator 510 may be welded to the structural elements 512 underlying the instrument panel 502 in the same way that the inflator 510 is welded within the door 502 described above. As exemplified in U.S. Pat. No. 6,386,580, herein incorporated by reference, the instrument panel 502 may be provided with a door, tear seam portion, or other airbag release mechanism as known in the art, thereby releasing the airbag 525 upon activation of gas generator 510. As also exemplified in U.S. Pat. No. 6,386,580, other features of the instrument panel 502 may be formed or provided as known in the art.

In sum, the present invention includes a vehicle component employing an airbag inflator not only as a gas generating means, but also as a structural member within the respective component. Accordingly, the inflators of the present invention incorporate hard and tough materials including steel, metal, or similarly strong materials. The inflator spans at least one desired dimension of the vehicle component thereby ensuring structural support and inflatable protection across the span of the desired dimension (height, depth, width, etc). The present invention also contemplates a method of manufacturing a vehicle component by welding or otherwise fixing an inflator within the component in substantial coextension with at least one desired dimension.

In yet another aspect of the invention, a method of manufacturing a vehicle component having at least one dimensional length is described, the method comprising the steps of: 1) providing an elongated perforated inflator substantially coextensive with the at least one dimensional length; 2) fixing the elongated perforated inflator within the vehicle component along the at least one dimensional length; 3) providing a propellant bed substantially coextensive with the elongated perforated inflator; and 4) providing an airbag in fluid communication with the inflator and substantially coextensive therewith, the airbag stored within the vehicle component.

A variety of fabrication methods may be used to construct an inflator housing having the desired form, depending upon the design requirements of the structural member in question. Manufacturing methods such as casting, machining, stamping, forming, molding, etc., may be used, depending on design requirements. Where the inflator housing is configured as a structural member of the vehicle, the housing/structural member may be attached to the remainder of the vehicle using methods normally used for attaching conventional, similarly-functioning structural members to a vehicle. The attachment method or methods used will vary according to the design requirements of the components to be joined, and may include various forms of welding or the use of fasteners.

In the embodiments discussed above, where the inflator housing is used as a structural member of the vehicle, it will be appreciated that the design of the inflator housing will comply with all regulations and standards for vehicle structural members promulgated by the National Highway Traffic Safety Administration (NHTSA).

Therefore, an inflator housing in accordance with the present invention may be employed as a primary, stand-alone structural member in a vehicle, or as a member used to reinforce another structural member in the vehicle. Where the inflator housing is used as a stand-alone structural member, the housing may be fabricated in the desired shape of the structural member. Alternatively, the housing may be formed having a cavity portion with a cylindrical cross-section as described herein. The cylindrical cavity portion may serve as the structural member, or one or more extensions as described herein may be detachably coupled to the cavity portion to provide a structural member having the desired configuration. Where the inflator housing is used to reinforce another structural member, the housing may be formed with a cavity portion having a cylindrical cross-section as described herein. The cylindrical cavity portion may be detachably coupled to the other structural member to provide the reinforcement, or one or more extensions as described herein may be detachably coupled to the cavity portion to provide the reinforcement.

It will be understood that the foregoing description of the preferred embodiment(s) of the present invention is for illustrative purposes only. As such, the various structural and operational features herein disclosed are susceptible to a number of modifications commensurate with the abilities of one of ordinary skill in the art, none of which departs from the scope of the present invention. For instance, in inflator 10, the aperture cross-sectional area may be varied from what is given in the examples. Accordingly, the average aperture diameter may range from 2.0 mm to 6.0 mm but is not thereby limited. Further, the other dimensions of inflator 10 such as the housing diameter and the housing length may be similarly modified. Other modifications will be understood in accordance with the contemplated breadth of the present inventions. The preceding description, therefore, is not meant to limit the scope of the invention. Rather, the scope of the invention is to be determined only by the appended claims and their equivalents.

What is claimed is:

1. A method of manufacturing a vehicle component having at least one dimensional length, the method comprising the steps of:
   providing an elongated perforated inflator substantially coextensive with said at least one dimensional length;
   fixing said elongated perforated inflator within said vehicle component along said at least one dimensional length, such that said inflator functions as a structural member of said vehicle component;
   providing a propellant bed substantially coextensive with said elongated perforated inflator, and
   providing an airbag in fluid communication with said inflator and substantially coextensive therewith, said airbag stored within said vehicle component.

2. A vehicle component formed by the method of claim 1.

3. A vehicle door formed by the method of claim 1.

4. The vehicle door of claim 3 wherein the inflator functions as a side intrusion beam assembly for vehicle occupant protection.

5. The method of claim 1 wherein said vehicle component has more than one dimensional length.

6. A vehicle component comprising at least one dimensional measurement, the component comprising:
- a perforated elongated inflator comprising an elongated housing fixed within the vehicle component, and an ignitable propellant bed within said housing and substantially coextensive with said housing;
- an airbag having a length, said airbag substantially coextensive with and in fluid communication with said inflator; and
- a release mechanism contained within said vehicle component for release of said airbag upon inflator activation,
- wherein said elongated inflator is substantially coextensive with said at least one dimensional measurement and is connected to the vehicle so as to function as a structural member of said vehicle component, and is also structured so as to provide substantially uniform inflation of the airbag along its length.

7. The vehicle component of claim 6 wherein the inflator includes a longitudinal tubular enclosure having a substantially uniform cross-sectional area along at least a portion of the enclosure, said longitudinal tubular enclosure having a first tubular perforated section with a first length and a plurality of first gas exit apertures formed therealong, each first gas exit aperture of the plurality of first gas exit apertures having a substantially equal cross-sectional area, said longitudinal tubular enclosure also having a second tubular perforated section formed in collinear relation with said first tubular perforated section, said second tubular perforated section having a second length and a plurality of second gas exit apertures formed therealong, each second gas exit aperture of the plurality of second gas exit apertures having a substantially equal cross-sectional area, said first perforated tubular section containing a first gas exit aperture area per unit length thereof and said second perforated tubular section containing a second gas exit aperture area per unit length thereof, said second gas exit aperture area per unit length being greater than said first gas exit aperture area per unit length.

8. The vehicle component of claim 6 wherein said component is an instrument panel.

9. The vehicle component of claim 6 wherein said component is a vehicle door.

10. The vehicle component of claim 9 wherein the inflator functions as a side intrusion beam assembly for vehicle occupant protection.

11. The vehicle component of claim 6 wherein said component is a seat.

12. The method of claim 1 wherein the step of providing an inflator further comprises the steps of:
- providing an inflator including a longitudinal tubular enclosure having a substantially uniform cross-sectional area along at least a portion of the enclosure, said longitudinal tubular enclosure having a first tubular perforated section with a first length and a plurality of first gas exit apertures formed therealong, each first gas exit aperture of the plurality of first gas exit apertures having a substantially equal cross-sectional area, said longitudinal tubular enclosure also having a second tubular perforated section formed in collinear relation with said first tubular perforated section, said second tubular perforated section having a second length and a plurality of second gas exit apertures formed therealong, each second gas exit aperture of the plurality of second gas exit apertures having a substantially equal cross-sectional area,
- said first perforated tubular section containing a first gas exit aperture area per unit length thereof and said second perforated tubular section containing a second gas exit aperture area per unit length thereof, said second gas exit aperture area per unit length being greater than said first gas exit aperture area per unit length.

13. A vehicle component comprising at least one dimensional measurement, the component comprising:
- a perforated inflator comprising an elongated multi-function housing fixed within the vehicle component and functioning as a housing for components of the inflator, and an ignitable propellant bed within said housing and substantially coextensive with said housing;
- an airbag having a length, said airbag substantially coextensive with and in fluid communication with said inflator; and
- a release mechanism contained within said vehicle component for release of said airbag upon inflator activation,
- wherein said inflator housing is substantially coextensive with said at least one dimensional measurement and is secured to a portion of the vehicle so as to also function as a structural member of said vehicle.

* * * * *

UNITED STATES PATENT AND TRADEMARK OFFICE
CERTIFICATE OF CORRECTION

PATENT NO. : 8,622,419 B2  
APPLICATION NO. : 11/191291  
DATED : January 7, 2014  
INVENTOR(S) : Khandhadia et al.

Page 1 of 1

It is certified that error appears in the above-identified patent and that said Letters Patent is hereby corrected as shown below:

In the Specification

Column 3; Line 51;  Please delete "Hoverer" and insert --However--

Signed and Sealed this  
Fifteenth Day of April, 2014

Michelle K. Lee  
*Deputy Director of the United States Patent and Trademark Office*